Figure 1:
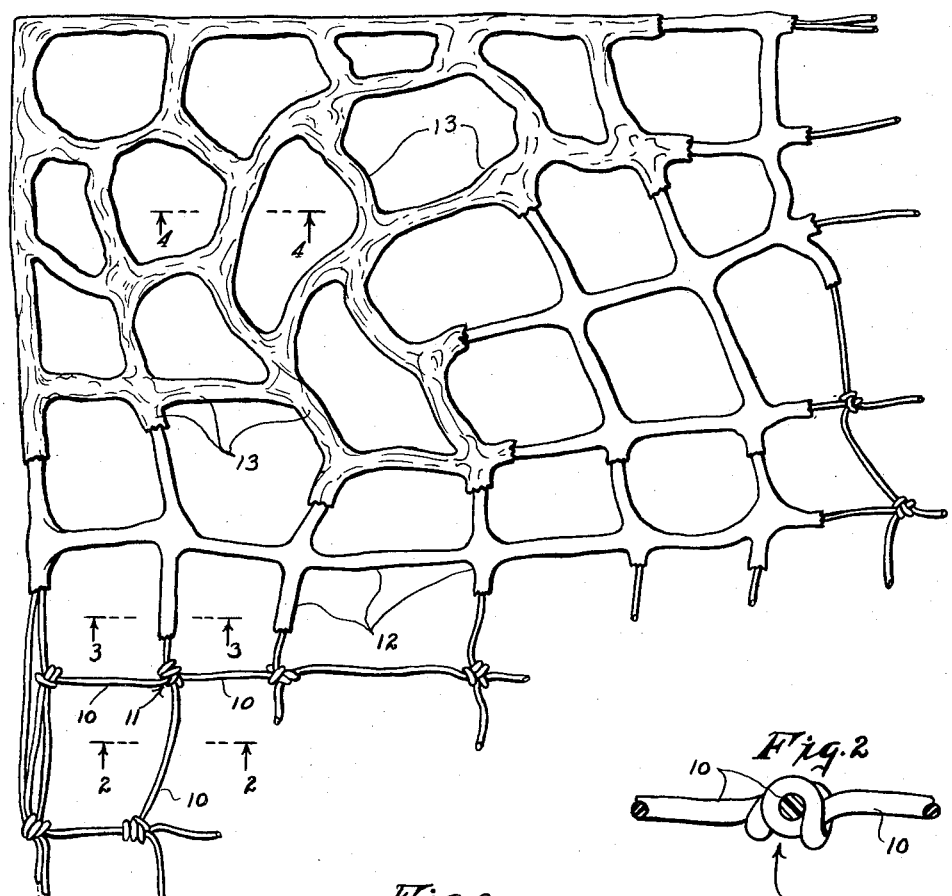

March 4, 1958 C. O. A. EKMAN 2,825,168
CAMOUFLAGE NETS
Filed Feb. 1, 1955

INVENTOR.
CARL OSCAR ALEXANDER EKMAN
BY MESTERN & FREY
ATTORNEY

United States Patent Office 2,825,168
Patented Mar. 4, 1958

2,825,168

CAMOUFLAGE NETS

Carl Oscar Alexander Ekman, Stockholm, Sweden, assignor to Firma Ekman & Brundin, Stockholm, Sweden Application February 1, 1955, Serial No. 485,611

5 Claims. (Cl. 41—10)

The present invention relates to camouflage nets and a method of making the same.

It is known that camouflage nets can be made from synthetic foils, e. g. of PVC, in which perforations are provided for the passage of air currents. Also used are camouflage nets made of natural or synthetic threads. Camouflage nets which are made of synthetic foils have a very low strength, so that they wear out rapidly, particularly in military use. Nets made of natural or synthetic threads, on the other hand, have to be further covered with additional camouflage material for satisfactory camouflage action; this involves added work and is time-consuming.

It has now been discovered that camouflage nets can be made which have the high strength of nets made from twisted threads, while having at the same time the satisfactory camouflage action of the nets made from synthetic foils with perforations, by making nets as follows:

A net is made from synthetic or natural twisted threads, or preferably from strings of monofilar, fully synthetic material. This net is similar in structure to a fishing net, which is usually formed of filiform material arranged in intersecting and spaced relationship and provided with knots formed therefrom securing said material at its points of intersection. The net is extended, and thereafter covered by means of a spray gun with a cobweb-like base of a viscous filament-forming synthetic product in solution. According to the invention, two different solutions of artificial resins or synthetics are used:

In a first spraying operation, a cob-web like base is produced on the net from a filament-forming solution of an artificial resin, preferably a vinyl resin. By choosing a highly diluted spraying solution of low viscosity, spun material of short fibers is obtained which mainly settles at the knots of the net. In a second operation, the coating material proper is applied which consists mainly of soft viscous synthetic rubber, showing no filament formation upon spraying or spreading: the emulsion colors are applied in this same operation.

It is clear that a device of this kind would likewise prove an obstacle to an air current and would, furthermore, obstruct the view. Moreover, the camouflage effect according to the invention is higher when the camouflage cover is not an awning-like body but one which is provided with shaped openings of various size.

Into the body made according to the invention, comprising a net or lattice structure and a compact foil, openings of various size and shape may be made according to the invention. One method consists in producing alternately jets of compressed air and of dissolved synthetic, when the net is covered with the cobweb-like coating by means of a spraying gun. Furthermore, a flame may be passed over the body, whereby the thinner portions between the mesh of the net are melted and holes of varying shape and size are likewise formed.

In order to increase the camouflage effect of such a net, the solution of synthetic may be mixed with camouflage colors or camouflage color may be applied to the net by spreading it according to known methods.

It is preferable to cover the net on both sides with the base varnish and the camouflage coating of synthetic rubber. It is also possible to have the camouflage differently colored on the two sides. For instance, one side may be coated with a conventional camouflage color, the other side painted white. This makes it possible to use the same net for mountain terrain with or without snow-covered areas.

The advantages of a net as described, comprising a structure of fibers, natural or synthetic with twisted or monofilar threads, or threads partly consisting of steel wire, sheathed entirely or partly with fully synthetic material serving as protection against corrosion, and covered with synthetic foil, consist mainly in the fact that the synthetic foil may be easily replaced by the same manufacturing method as soon as it is worn down by use.

The best material to use for the net structure are polyamides in the form of monofilar strings, since these are very resistant to wear by friction, are light-weight and exhibit a tear resistance of 35–65 kg./mm.$^2$; they bond well with the sprayed-on foil. It is obvious that the netting with this material has to be done in a way that the knots will not slip. However, this may also be accomplished by treating the knots with an adhesive. The mesh width should preferably be 4–8 cms.

A net of a square size of e. g. 2 x 2 meters made from polyamide monofilar thread, having a diameter of 0.40 mm. and a mesh number of 20 per meter, covered with a PV resin varnish and a camouflage coating of synthetic rubber, weighs about 625 grams. The camouflage net is very resistant to wear and weather, and is moisture repellent, so that no increase in weight will occur due to absorbed water. This is of great importance for military purposes.

In the accompanying drawing a preferred embodiment of the invention is illustrated but it is understood that the embodiment is shown by way of illustration and not of limitation.

Figure 2:
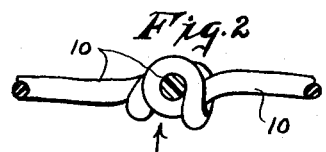
Figure 3:
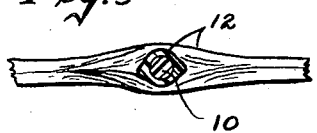
Figure 4:
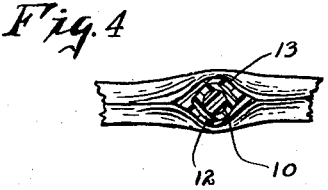

Fig. 1 shows part of the camouflage netting structure and the elements forming same in progressive order, Fig. 2 is a section of the filiform netting and knots taken on line 2—2 of Fig. 1, Fig. 3 is a section on lines 3—3 of Fig. 1 and Fig. 4 a section on line 4—4 of Fig. 1.

Referring now to the drawing in detail, Fig. 2 shows an enlarged section of the filiform material 10 and the knots 11 forming the netting. In Fig. 3 is shown an enlarged cross-section of the netting with the coating 12 of polyethylene resin. In Fig. 4 another enlarged cross-section of the complete net showing the second layer 13 of polyethylene resin formed into irregular extensions for producing a camouflage effect.

What I claim is:

1. As an article of manufacture, a camouflage net comprising a net structure of filiform material, arranged in intersecting and spaced relationship and forming a mesh, knots formed of said filiform material for securing same at its points of intersection, a coating of polyvinyl resin covering only said filiform material and said knots, with a second layer of a synthetic rubber so applied in attenuated form as to extend into said openings to form irregularly distributed extensions of said resin in said openings for allowing the passage of air currents through said resultant irregular openings.

2. A camouflage net according to claim 1, comprising as material of the net structure a fully synthetic fiber.

3. A camouflage net according to claim 1, comprising as material of the net structure a monofilar polyamide.

4. A camouflage net according to claim 1, comprising as material of the net structure a natural fiber.

5. A camouflage net according to claim 1, comprising as material of the net structure metal wire.

References Cited in the file of this patent

UNITED STATES PATENTS

| | | |
|---|---|---|
| 692,467 | Mugnier | Feb. 4, 1902 |
| 1,967,923 | Connolly | July 24, 1934 |
| 2,399,258 | Taylor | Apr. 30, 1940 |
| 2,357,392 | Francis | Sept. 5, 1944 |
| 2,364,289 | Hale | Dec. 5, 1944 |
| 2,713,001 | Manning | July 12, 1955 |

OTHER REFERENCES

Hirata et al.: Abstract, vol. 660, p. 482 O. G. July 8, 1952.